United States Patent
Zhang et al.

(10) Patent No.: US 12,153,892 B1
(45) Date of Patent: *Nov. 26, 2024

(54) USE OF SEMANTIC CONFIDENCE METRICS FOR UNCERTAINTY ESTIMATION IN LARGE LANGUAGE MODELS

(71) Applicant: Intuit Inc., Mountain View, CA (US)

(72) Inventors: Jiaxin Zhang, Mountain View, CA (US); Kamalika Das, Saratoga, CA (US); Sricharan Kallur Palli Kumar, Ann Arbor, MI (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/425,869

(22) Filed: Jan. 29, 2024

Related U.S. Application Data

(63) Continuation of application No. 18/360,956, filed on Jul. 28, 2023, now Pat. No. 11,922,126.

(51) Int. Cl.
*G06F 40/30* (2020.01)

(52) U.S. Cl.
CPC .................................. *G06F 40/30* (2020.01)

(58) Field of Classification Search
CPC ....................................................... G06F 40/30
See application file for complete search history.

(56) References Cited

U.S. PATENT DOCUMENTS

| | | | |
|---|---|---|---|
| 7,685,116 B2 * | 3/2010 | Pell | G06F 16/243 707/999.004 |
| 9,318,108 B2 * | 4/2016 | Gruber | G10L 15/26 |
| 2005/0080780 A1 | 4/2005 | Colledge et al. | |
| 2016/0140208 A1 | 5/2016 | Dang et al. | |
| 2016/0179945 A1 | 6/2016 | Lastra Diaz et al. | |
| 2019/0286645 A1 * | 9/2019 | Wegryn | G06F 16/90344 |
| 2020/0111021 A1 | 4/2020 | Keyngnaert et al. | |
| 2021/0200454 A1 * | 7/2021 | Kim | G06F 3/0631 |
| 2024/0152787 A1 * | 5/2024 | Alam | G06N 3/08 |

OTHER PUBLICATIONS

Lin, S., et al., "Teaching Models to Express their Uncertainty in Words", Jun. 13, 2022 (19 pages).
Kadavath, S., et al., "Language Models (Mostly) Know What They Know", Nov. 21, 2022 (43 pages).
Kuhn, L., et al., "Semantic Uncertainty: Linguistic Invariances for Uncertainty Estimation in Natural Language Generation", ICLR 2023, Apr. 15, 2023 (19 pages).

\* cited by examiner

*Primary Examiner* — Eric Yen
(74) *Attorney, Agent, or Firm* — Lathrop GPM LLP

(57) ABSTRACT

A method includes receiving a user input including natural language text. The method also includes generating modified inputs from the user input. The method also includes executing a machine learning model on the modified inputs to generate model outputs. The method also includes sampling the model outputs using a statistical sampling strategy to generate sampled model outputs. The method also includes clustering the sampled model outputs into clusters. The method also includes generating a confidence metric of the clusters. The method also includes routing, automatically in a computing system, the user input based on whether the confidence metric satisfies a threshold value.

20 Claims, 6 Drawing Sheets

USE OF SEMANTIC CONFIDENCE METRICS FOR UNCERTAINTY ESTIMATION IN LARGE LANGUAGE MODELS

RELATED APPLICATIONS

This application is a continuation application of U.S. application Ser. No. 18/360,956, filed Jul. 28, 2023, the entirety of which is hereby incorporated by reference.

BACKGROUND

A large language model is a type of machine learning model that can perform natural language processing tasks, such as generating and classifying text, answering questions, and translating text. Large language models are based on deep learning models which are trained on large amounts of natural language text data. During training, large language models learn patterns and relationships within a language. The large language model then uses the patterns and relationships to predict the likelihood of a next word based on the words that came before the current word being predicted. It is possible for a large language model to generate entire paragraphs or compositions of text in this manner. An example of a large language model is CHATGPT®, owned by Open AI, L.P.

The output of large language models may not make sense to a human in some cases. Additionally, small changes in text or meaning may result in different answers being output by the large language model. Furthermore, large language models do not always generate exactly the same output when an identical input is provided to the large language model multiple times. Thus, large language models may be associated with an uncertainty, or at least may produce semantically inconsistent outputs.

As used herein, the term "large language model" is an industry standard term. Thus, the term "large," as used herein, is understood and ascertainable by a computer scientist. Furthermore, as used herein, the term "model" refers to one or more machine learning models.

SUMMARY

One or more embodiments provide for a method. The method includes receiving a user input including natural language text. The method also includes generating modified inputs from the user input. The method also includes executing a machine learning model on the modified inputs to generate model outputs. The method also includes sampling the model outputs using a statistical sampling strategy to generate sampled model outputs. The method also includes clustering the sampled model outputs into clusters. The method also includes generating a confidence metric of the clusters. The method also includes routing, automatically in a computing system, the user input based on whether the confidence metric satisfies a threshold value.

One or more embodiments also provide for a system including a processor and a machine learning model executable by the processor. The machine learning model includes a language processing machine learning model. The system also includes a data repository in communication with the processor. The data repository stores a user input including natural language text. The data repository also stores modified inputs. The data repository also stores model outputs of the machine learning model. The data repository also stores sampled model outputs of the machine learning model. The data repository also stores clusters of the sampled model outputs of the machine learning model. The data repository also stores a confidence metric of the clusters. The data repository also stores a threshold value comparable to the confidence metric. The system also includes a confidence estimation controller which, when executed by the processor executes the machine learning model to generate the model outputs. The confidence estimation controller, when executed by the processor, also samples the model outputs using a statistical sampling strategy to generate the sampled model outputs. The confidence estimation controller, when executed by the processor, also clusters the sampled model outputs into the clusters. The confidence estimation controller, when executed by the processor, also generates the confidence metric. The system also includes a machine learning controller configured to route, automatically, the user input based on whether the confidence metric satisfies or fails to satisfy the threshold value.

One or more embodiments also provide for a non-transitory computer readable storage medium storing computer readable program code which, when executed by a processor, performs a computer-implemented method including receiving a user input including natural language text. The method also includes generating modified inputs from the user input. The method also includes executing a machine learning model on the modified inputs to generate model outputs. The method also includes sampling the model outputs using a statistical sampling strategy to generate sampled model outputs. The method also includes clustering the sampled model outputs into clusters. The method also includes generating a confidence metric of the clusters. The method also includes routing, automatically in a computing system, the user input based on whether the confidence metric satisfies a threshold value.

Other aspects of the one or more embodiments will be apparent from the following description and the appended claims.

BRIEF DESCRIPTION OF DRAWINGS

Like elements in the various figures are denoted by like reference numerals for consistency.

DETAILED DESCRIPTION

Figure 1A:
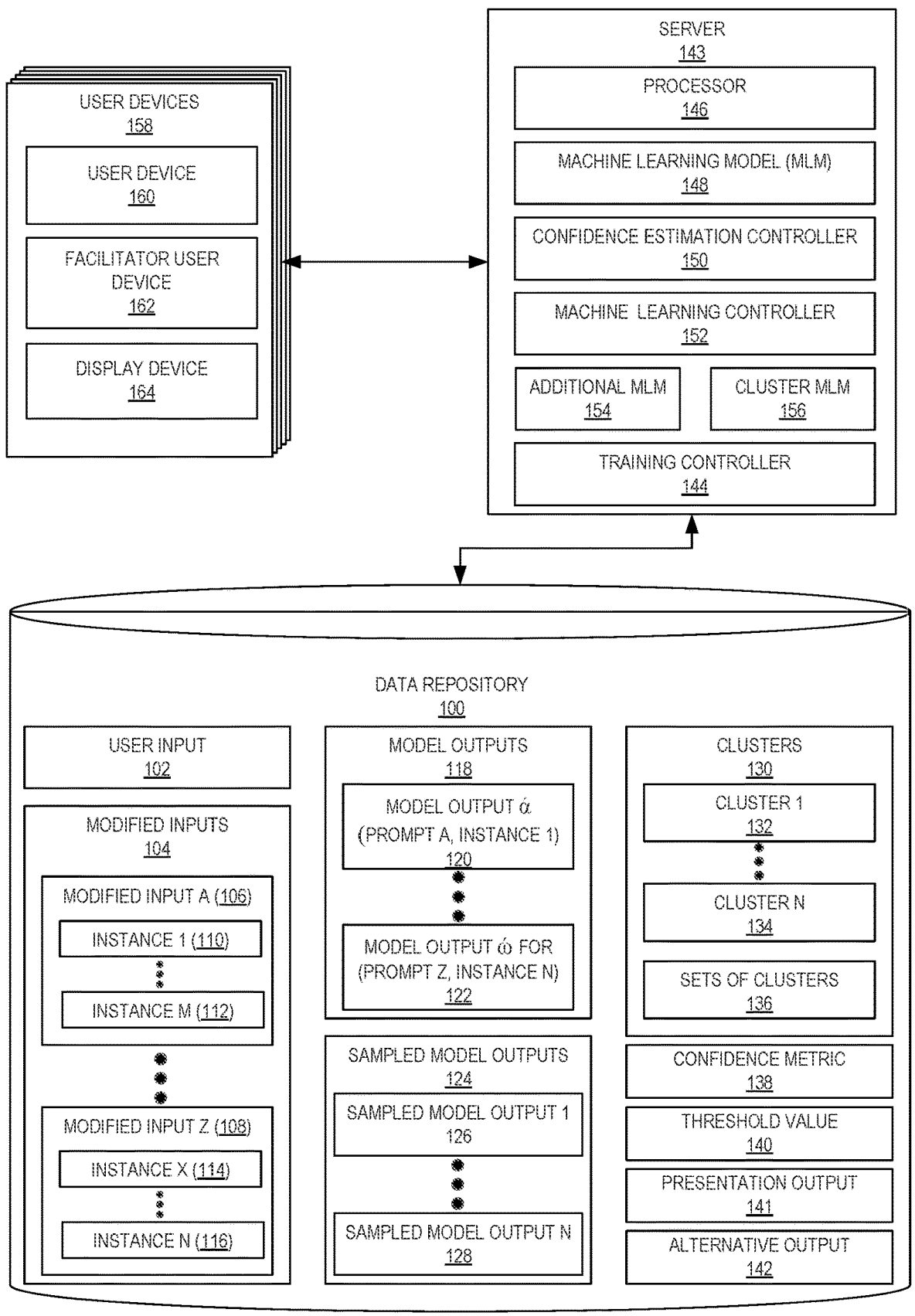
FIG. 1A and FIG. 1B show a computing system, in accordance with one or more embodiments.

In general, the one or more embodiments are directed to use of semantic confidence metrics for uncertainty estimation in large language models. As indicated above, large language models may not generate answers that are useful to a human asking a question. For example, the model may not properly process the semantic intent of a human asking a question. As a specific example, a human may ask, "are the bills coming like it was raining cats and dogs?" The large language model may not understand the semantic intent of the human query and respond with outputs such as, "I do not understand" or "cats and dogs do not fall like rain." Either answer may be deemed undesirable in some cases.

Additionally, small perturbations in language may result in the large language model producing different, possibly inconsistent, answers. Indeed, the same input provided multiple times to the large language model may produce different answers which may, or may not, be consistent. Thus, a large language model may be subject to multiple forms of uncertainty, leading to an undesirable performance of the large language model.

The uncertainty may, in turn, affect other systems. For example, a large language model may generate answers to inputs provided to a chatbot. Thus, from the perspective of a user, the chatbot automatically generates answers to human-supplied queries. If the chatbot does not provide consistent answers that make sense to a human, the performance of the chatbot may be deemed undesirable in some cases.

The one or more embodiments address these and other technical difficulties that arise from uncertainty in large language models, as well as uncertainty in other natural language processing models. In particular, the one or more embodiments measure an uncertainty associated with a user-supplied input to the large language model. Note that the uncertainty of the model itself might not be measured, but rather the uncertainty that is associated with a particular user input provided to a particular model. Thus, the one or more embodiments measure a combination of uncertainty in the user input and the machine learning model output. The uncertainty measured by the one or more embodiments may be referred-to as a semantic confidence metric, or more succinctly as a "confidence metric."

As more fully explained with respect to FIG. 2, the confidence metric is generated as follows. A user input is received. Variations of the user input are generated and supplied to the machine learning model as input. The outputs of the machine learning model are sampled, and then the sampled outputs are clustered into clusters that represent a specific semantic meaning of the sampled outputs. The entropy of the clusters may be measured. The entropy may be the confidence metric.

If the confidence metric satisfies a threshold value, then the user input may be routed to the machine learning model in question. However, if the confidence metric fails to satisfy the threshold value, then the user input may be routed to some other destination in a computing system, such as but not limited to some different machine learning model or to a human facilitator who can review and answer the user input.

Figure 3:
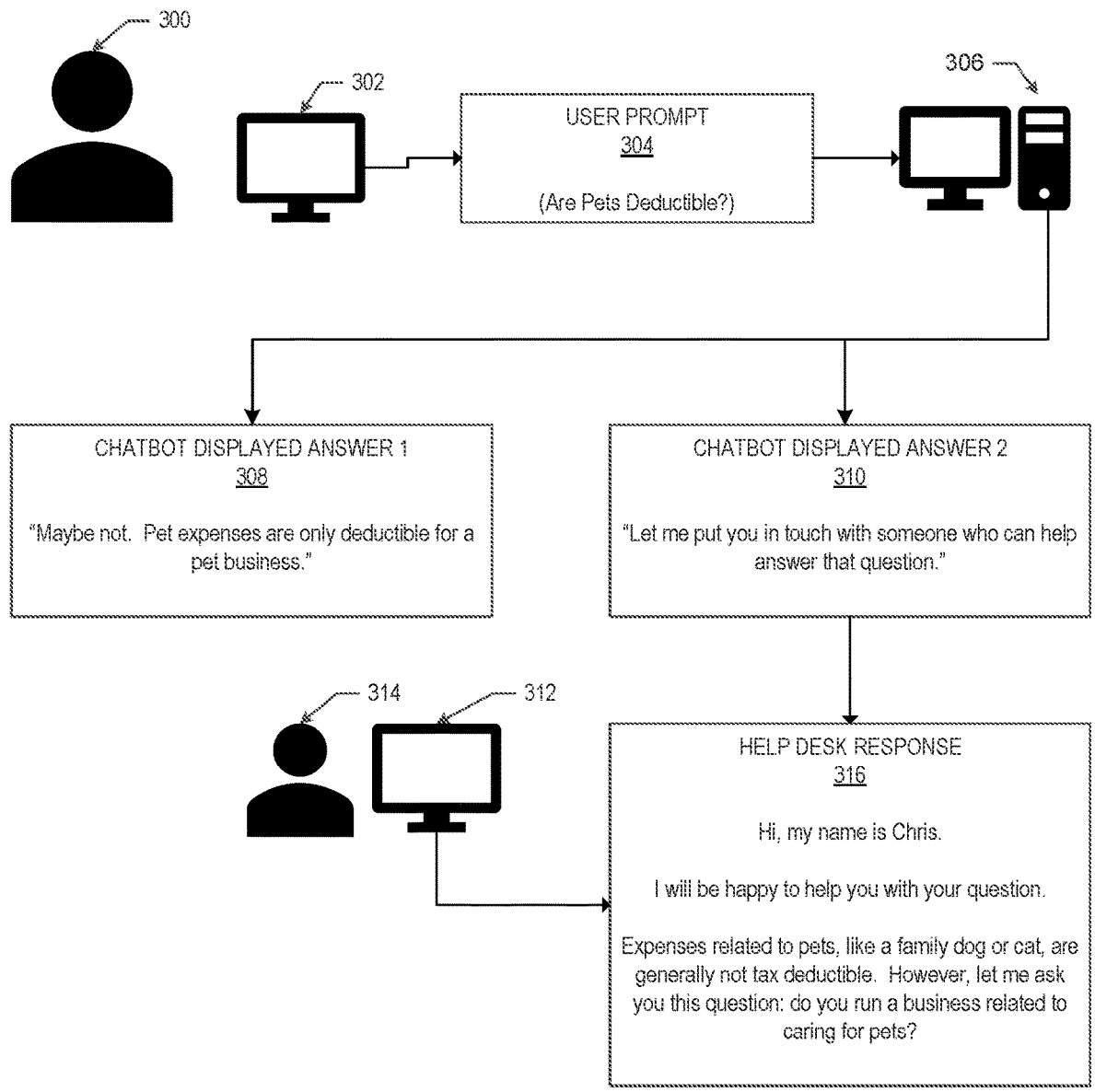
FIG. 3 and FIG. 4 show an example use of semantic confidence metrics for uncertainty estimation in large language models, in accordance with one or more embodiments.
Figure 4:
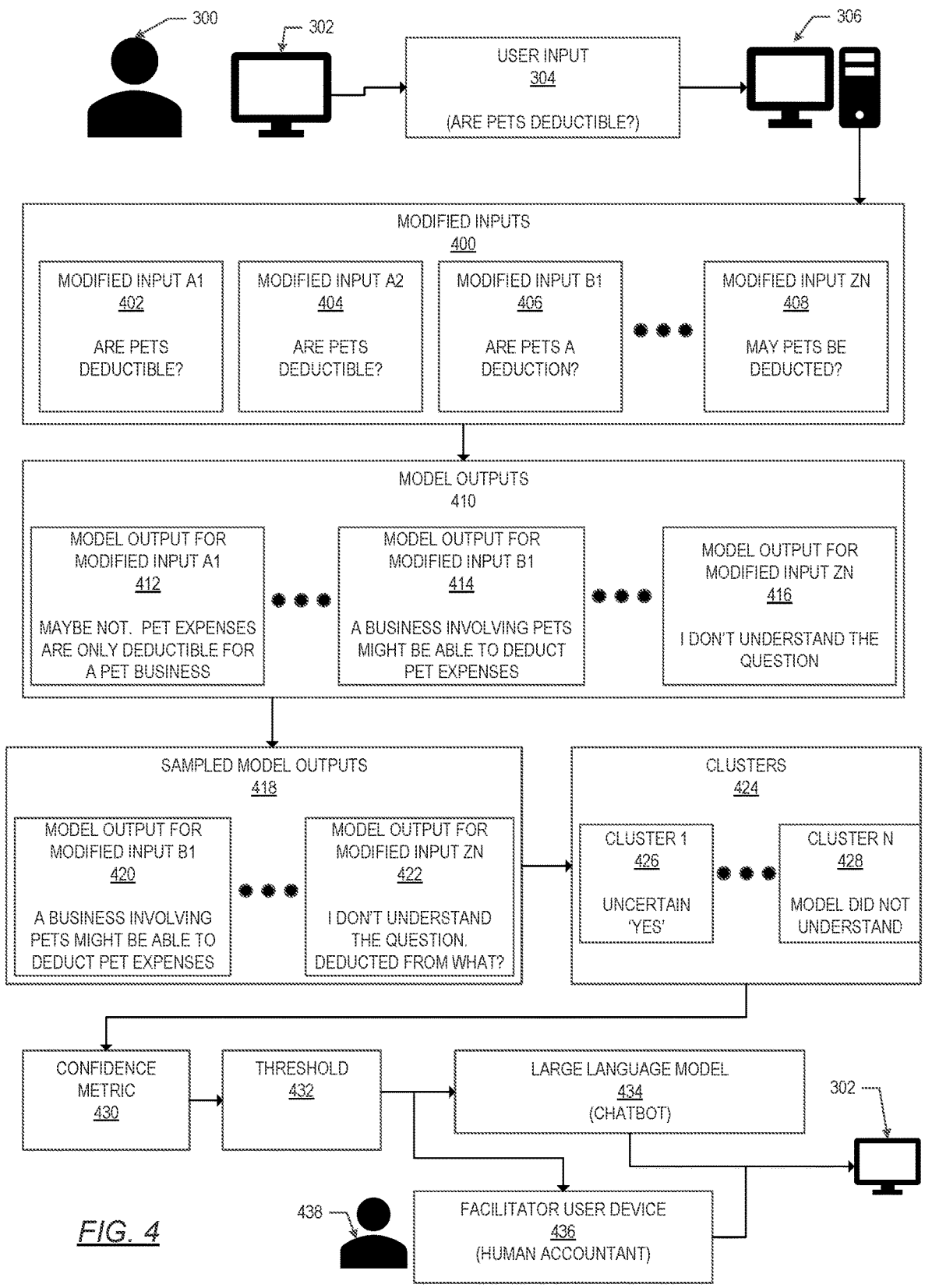

Thus, as described further with respect to the example of FIG. 3 and FIG. 4, the one or more embodiments may be used to evaluate whether a machine learning model that drives a chatbot "understands" a user input (i.e., the confidence metric meets a threshold value). If so, then the user input may be routed to the machine learning model, which in turn automatically generates a response to the user query. If not, then the user input may be routed to a human facilitator, or may be routed to some other machine learning model which may be a different model, trained differently on a different corpus, or some combination thereof. As a result, the user experience may be improved by returning more consistent and more relevant answers to a user.

Attention is now turned to the figures. FIG. 1 shows a computing system, in accordance with one or more embodiments. The system shown in FIG. 1 includes a data repository (100). The data repository (100) is a type of storage unit and/or device (e.g., a file system, database, data structure, or any other storage mechanism) for storing data. The data repository (100) may include multiple different, potentially heterogeneous, storage units and/or devices.

The data repository (100) stores a user input (102). The user input (102) is natural language text. The user input (102) may be user input received from a user device operated by a human. However, the user input (102) may be defined by an automated computer process, such as by another language processing model. In either case, the user input (102) is received at a server executing a machine learning model, as described below.

The data repository (100) also include modified inputs (104), such as modified input A (106) and modified input Z (108). The ellipsis between the modified input A (106) and the modified input Z (108) indicate that many more modified inputs may be present other than the modified input A (106) and the modified input Z (108) shown.

A modified input (e.g., the modified input A (106) or the modified input Z (108)) is a modification of the user input (102), and thus is natural language text that is a modified version of the original natural language text received as the user input (102). As described further with respect to FIG. 2, the user input (102) originally received is modified into different statements which are semantically related to the user input (102).

The term "related to" means that the modified inputs (104) are generated automatically by inputting the user input (102) into a machine learning model. However, the semantic meanings of the user input (102) and a given modified input of the modified inputs (104) may be similar or dissimilar, as described further below.

Each modified input includes an instance. Thus, for example, the modified input A (106) includes instance 1 (110) and instance M (112). Similarly, the modified input Z (108) includes instance X (114) and instance N (116). The ellipsis between the instance 1 (110) and the instance M (112) indicate that many more instances may exist for the modified input A (106). The ellipsis between the instance X (114) and the instance N (116) indicate that many more instances may exist for the modified input Z (108).

An instance is a duplicate of the corresponding modified input. Thus, for example, both the instance 1 (110) and the instance M (112) are the same inputs as the modified input A (106). Similarly, the instance X (114) and the instance N (116) are the same inputs as the modified input Z (108). As described above, the same input to a large language model may result in a different output; thus, according to the one or more embodiments, to measure the confidence of the corresponding input to the machine learning model, it is desirable to input the same input multiple times.

As indicated above, the modified inputs (104) may include variations of the user input (102) that are semantically similar to the user input (102) and also may include variations of the user input (102) that are semantically different than the user input (102). Thus, the modified inputs (104) may be invariant (i.e., semantically similar or the same as the user input (102)) or may be equivariant (i.e., semantically different than the user input (102)). The degree of semantic difference between the user input (102) and one of the modified inputs (104) may be determined using machine learning or other techniques which quantize and then evaluate the semantic meaning of natural language text. For example, the vector embeddings that represent the two texts in question may be fed to a machine learning model, which then may determine the cosine similarity between the vector embeddings.

A vector is a N×M matrix (often 1×M) which defines data as a number of features, for which a value is assigned to each feature. Thus, for example, in language processing, a word, letter, phrase, or combination thereof may be represented as a feature, and information about that feature (e.g., the presence or absence of the feature) is associated with the feature in the form of a number which represents the nature of the feature. For example, if a feature defined for a vector is "whether the letter 'Y' is present", then if the value is "1," then the letter "Y" is present. Otherwise, if the value is "0," then the letter "Y" is not present.

The data repository (100) also stores model outputs (118), including model output $\acute{\alpha}$ (120) and model output $\acute{\omega}$ (122). The ellipsis between the model output $\acute{\alpha}$ (120) and the model output $\acute{\omega}$ (122) indicate that many model outputs (118) may be present.

Each model output of the model outputs (118) is the result of the machine learning model executing on one of the modified inputs (104). Thus, for example, the model output $\acute{\alpha}$ (120) is the model output when the instance 1 (110) of the modified input A (106) is input into to the machine learning model and the machine learning model is executed. Similarly, the model output $\acute{\omega}$ (122) is the model output when the instance N (116) of the modified input Z (108) is input into to the machine learning model and the machine learning model is executed. Thus, each instance of the modified inputs (104) will correspond to one of the model outputs (118).

The data repository (100) also stores sampled model outputs (124), such as sampled model output 1 (126) and sampled model output N (128). The ellipsis between the sampled model output 1 (126) and the sampled model output N (128) indicate that many more of the sampled model outputs (124) may be present.

It may be desirable in some cases to use only a portion of the model outputs (118) when determining the confidence score used in the one or more embodiments. Thus, in one embodiment, a statistical sampling method may be used to select some, but not all, of the model outputs (118). After statistical sampling, those selected ones of the model outputs (118) that remain are the sampled model outputs (124). Thus, each of the sampled model outputs (124) corresponds to one of the model outputs (118), excepting that not all of the model outputs (118) are represented by the sampled model outputs (124).

The data repository (100) also stores clusters (130), including cluster 1 (132) and cluster N (134). The ellipsis between the cluster 1 (132) and the cluster N (134) indicate that many more clusters may be present in the clusters (130).

A cluster is a grouping of the sampled model outputs (124) (or a grouping of the model outputs (118) in the case that statistical sampling is not performed on the model outputs (118)). The number of clusters (130) may be a hyperparameter of a clustering machine learning model.

Each of the clusters (130) represents a different semantic meaning of the sampled model outputs (124) (or the model outputs (118)), as determined by a machine learning model. Thus, the cluster 1 (132) has one semantic meaning, and the cluster N (134) has a different semantic meaning than the cluster 1 (132). In other words, each cluster of the clusters (130) may represent a distinct semantic meaning of the sampled model outputs (124). The generation of the clusters (130) is described with respect to FIG. 2.

It is possible that multiple different clustering techniques may be used to generate multiple sets of clusters. Therefore, in an embodiment, there may be sets of clusters (136). Each of the sets of clusters (136) represents a group of clusters that combine semantically similar ones of the model outputs (118) or the sampled model outputs (124) into individual clusters within a given set of clusters.

Thus, the sets of clusters (136) may include one set of clusters that clustered the model outputs (118) or the sampled model outputs (124) by one clustering technique, and another set of clusters that clustered the model outputs (118) or the sampled model outputs (124) by a different clustering technique. As described further below, the one or more embodiments contemplate determining the confidence metric (138) using just the clusters (130), or one or more of the sets of clusters (136).

The data repository (100) also stores the confidence metric (138). The confidence metric (138) is a measure of uncertainty of the natural language model with respect to the modified inputs (104) specifically. In other words, the confidence metric (138) may change even when the same natural language model is applied to a different text input. Thus, the confidence metric (138) takes into account uncertainty in both the modified inputs (104) and in the machine learning model. Generation of the confidence metric is described with respect to FIG. 2.

The data repository (100) also may store a threshold value (140). The threshold value (140) is a number or a set of numbers comparable to the confidence metric (138). Use of the threshold value (140) is described with respect to FIG. 2.

The data repository (100) also stores a presentation output (141). The presentation output (141) is a final result that is transmitted to a user device (defined below). As described further below with respect to FIG. 2, satisfaction of the confidence metric (138) may route the user input (102) to either a machine learning model or to some other destination (such as a human facilitator). The result of the machine learning model (or the answer provided by the human facilitator) is the presentation output (141) that is presented to a user device of a user.

The data repository (100) also stores an alternative output (142). The alternative output (142) is the output of some other machine learning model (or some other system) that is determined based on the user input (102). The alternative output (142) may be the presentation output (141) in some cases.

The system shown in FIG. 1A also may include a server (143). The server (143) is one or more computing systems, possibly in a distributed computing environment. An example of the server (143) may be the computing system shown in FIG. 5A.

The server (143) may host and/or execute one or more processes, software, applications, etc. For example, the server (143) may include a training controller (144). The training controller (144) is software or application specific hardware programmed, when executed by the processor (146), to train one or more of the machine learning models described herein. Operation of the training controller (144), and machine learning training, is described with respect to FIG. 1B.

The server (143) also may include a processor (146). The processor (146) is hardware or virtual machines configured to execute the controllers and machine learning models described herein. The processor (146) may include multiple processors units, possibly in a distributed computing environment. An example of the processor (146) may be the computer processor(s) (502) described with respect to FIG. 5B.

The server (143) also may include a machine learning model (148). The machine learning model (148) may be referred to as a "MLM." The machine learning model (148), in particular, is a natural language processing model, such as a large language model. The machine learning model (148) may be a large language model, such as but not limited to CHATGPT®, owned by Open AI, L.P. In the one or more embodiments, the machine learning model (148) is the machine learning model being evaluated when the user input (102) is supplied as input.

The server (143) also may include a confidence estimation controller (150). The confidence estimation controller (150) is software or application specific hardware programmed, when executed by the processor (146), to generate the confidence metric (138) as described with respect to FIG. 2. The confidence estimation controller (150) also may be programmed to compare the confidence metric (138) to the threshold value (140), and to route the user input (102) accordingly.

The server (143) also may include one or morwe additional machine learning models, such as additional MLM (154) or cluster MLM (156). The additional MLM (154) is a language processing model, other than the machine learning model (148). For example, the additional MLM (154) may be a natural language model that is trained on domain-specific data. For example, if the confidence metric (138) fails to satisfy the threshold value (140) for the user input (102), then the domain of the user input (102) may be determined and another attempt made by the additional MLM (154) to automatically determine an appropriate response to the user input (102). Note that the procedures of described with respect to FIG. 2, below, may be repeated to measure the confidence of the additional MLM (154). Thus, routing the user input (102) may include multiple steps (e.g., routing the user input (102) first to the additional MLM (154), then to a human facilitator if the confidence metric (138) for the additional MLM (154) also fails the threshold value (140)).

The server (143) also may include a cluster MLM (156). The cluster MLM (156) is a machine learning model trained to perform the clustering operation that generates the clusters (130), defined above. In other words, the cluster MLM (156) clusters the sampled model outputs (124) (or the model outputs (118)) to generate the clusters (130). Clustering is performed as described with respect to FIG. 2.

The system shown in FIG. 1 optionally may include one or more user devices (158). The user devices (158) are computing systems (desktops, laptops, mobile phones, tablets, etc.) that are used by human users or by automated processes (e.g., other software that may generate the user input (102)). In some embodiments, the user devices (158) are not part of the system shown in FIG. 1, but rather are remote devices that are not under the control of the entity that manages the server (143).

The user devices (158) may include a user device (160). The user device (160) is an instance of the user devices (158) that generates the user input (102) as described herein.

The user devices (158) may include a facilitator user device (162). The facilitator user device (162) is an instance of the user devices (158) that a human person may use to answer the user input (102). An example of the facilitator user device (162) is shown in FIG. 3.

The user devices (158) may include a display device (164). The display device (164) is a monitor, television, touchscreen, speaker, etc. configured to generate visual, audio, or haptic output.

Figure 1B:
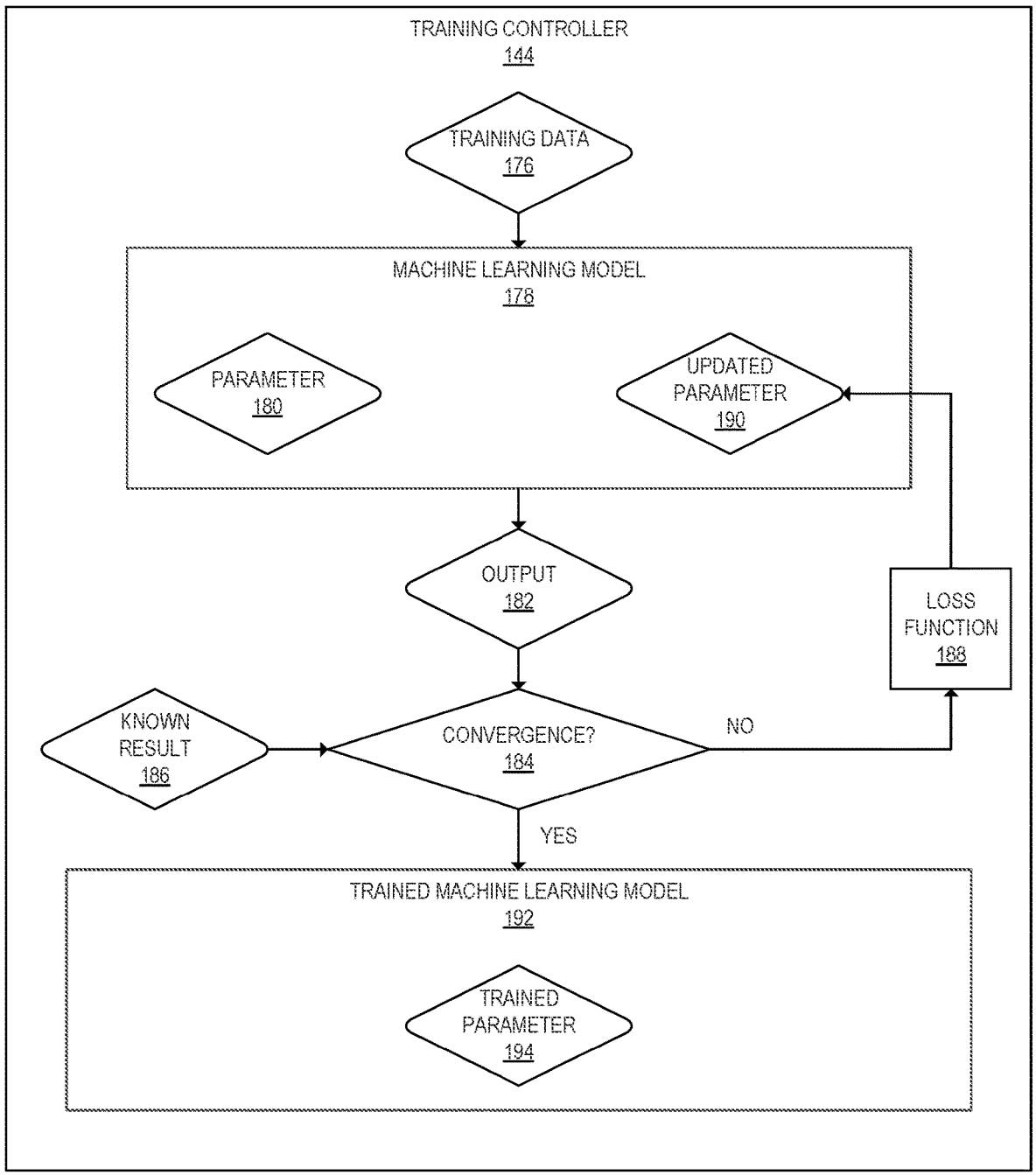

Attention is turned to FIG. 1B, which shows the details of the training controller (144). As described above, the training controller (144) is a training algorithm, implemented as software or application specific hardware, that may be used to train one or more the machine learning models described with respect to FIG. 1A, including the machine learning model (148), the additional MLM (154) and the cluster MLM (156).

In general, machine learning models are trained prior to being deployed. The process of training a model, briefly, involves iteratively testing a model against test data for which the final result is known, comparing the test results against the known result, and using the comparison to adjust the model. The process is repeated until the results do not improve more than some predetermined amount, or until some other termination condition occurs. After training, the final adjusted model (i.e., the trained machine learning model (192)) is applied to unknown data (e.g., the user input (102) of FIG. 1A) in order to make predictions.

In more detail, training starts with training data (176). The training data (176) is data for which the final result is known with certainty. For example, if the machine learning task is to identify whether two names refer to the same entity, then the training data (176) may be name pairs for which it is already known whether any given name pair refers to the same entity.

The training data (176) is provided as input to the machine learning model (178). The machine learning model (178), as described before, is an algorithm. However, the output of the algorithm may be changed by changing one or more parameters of the algorithm, such as the parameter (180) of the machine learning model (178). The parameter (180) may be one or more weights, the application of a sigmoid function, a hyperparameter, or possibly many different variations that may be used to adjust the output of the function of the machine learning model (178).

One or more initial values are set for the parameter (180). The machine learning model (178) is then executed on the training data (176). The result is a output (182), which is a prediction, a classification, a value, or some other output which the machine learning model (178) has been programmed to output.

The output (182) is provided to a convergence process (184). The convergence process (184) compares the output (182) to a known result (186). A determination is made whether the output (182) matches the known result (186) to a pre-determined degree. The pre-determined degree may be an exact match, a match to within a pre-specified percentage, or some other metric for evaluating how closely the output (182) matches the known result (186). Convergence occurs when the known result (186) matches the output (182) to within the pre-determined degree.

If convergence has not occurred (a "no" at the convergence process (184)), then a loss function (188) is generated. The loss function (188) is a program which adjusts the parameter (180) in order to generate an updated parameter (190). The basis for performing the adjustment is defined by the program that makes up the loss function (188), but may be a scheme which attempts to guess how the parameter (180) may be changed so that the next execution of the machine learning model (178) using the training data (176) with the updated parameter (190) will have an output (182) that more closely matches the known result (186).

In any case, the loss function (188) is used to specify the updated parameter (190). As indicated, the machine learning model (178) is executed again on the training data (176), this time with the updated parameter (190). The process of execution of the machine learning model (178), execution of the convergence process (184), and the execution of the loss function (188) continues to iterate until convergence.

Upon convergence (a "yes" result at the convergence process (184)), the machine learning model (178) is deemed to be a trained machine learning model (192). The trained machine learning model (192) has a final parameter, represented by the trained parameter (194).

During deployment, the trained machine learning model (192) with the trained parameter (194) is executed again, but this time on the unknown data for which the final result is not known. The output of the trained machine learning model (192) is then treated as a prediction of the information of interest relative to the unknown data.

While FIG. 1A and FIG. 1B show a configuration of components, other configurations may be used without departing from the scope of the one or more embodiments. For example, various components may be combined to create a single component. As another example, the functionality performed by a single component may be performed by two or more components.

Figure 2:
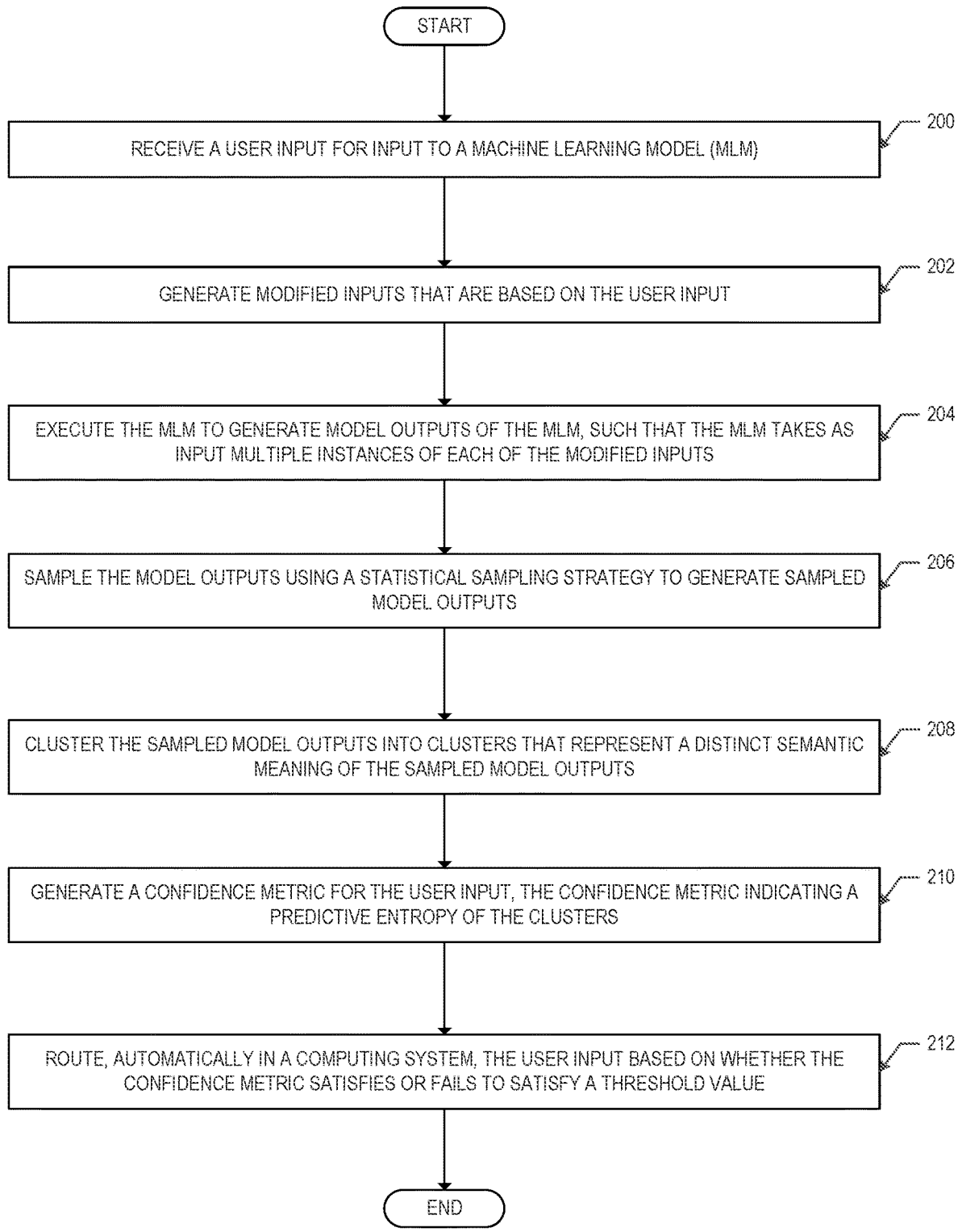
FIG. 2 shows a method of using semantic confidence metrics for uncertainty estimation in large language models, in accordance with one or more embodiments.

FIG. 2 shows a method of using semantic confidence metrics for uncertainty estimation in large language models, in accordance with one or more embodiments. The method of FIG. 2 may be performed using the system of FIG. 1A.

Step 200 includes receiving a user input for input to a machine learning model (MLM). The user input may be received from a user device which received human input that generated the user input. The user input may be received from an automated process (e.g. some other machine learning model, or perhaps the machine learning model under test in some cases-if prompted to generate the user input).

Step 202 includes generating modified inputs that are based on the user input. As indicated above, the modified inputs each are semantically related to the user input. Also as described above, the term "related to" does not necessarily mean similar semantic meaning. In an example, generating the modified inputs may include generating semantically invariant prompts that are semantically similar to the user input. In another example, generating the modified inputs may include generating semantic equivariant inputs that alter a semantic meaning of the user input.

The modified inputs are generated by inputting the user input into a machine learning model. The user inputs may be input into the machine learning model under test in some cases, with a command to the machine learning model to vary the original input. The modified inputs also may be generated by some other machine learning model. The modified inputs also may be provided by a human computer scientist. The modified inputs also may be generated by duplicating a modified input that is different than the original user input. The modified inputs may include, in some cases, the original user input or duplicates thereof.

Step 204 includes executing the MLM to generate model outputs of the MLM, such that the MLM takes as input multiple instances of each of the modified inputs. In other words, each of the modified inputs (including instances of the modified inputs) are provided as input to the machine learning model under test. The machine learning model generates an output for each modified input and for each instance of a modified input. Operation of the machine learning model may be that of a large language model, such as but not limited to CHATGPT®, owed by Open AI, L.P.

Step 206 includes sampling the model outputs using a statistical sampling strategy to generates sample model outputs. Step 206 may be optional in some embodiments, such as when the number of the modified outputs is below some threshold number determined by a computer technician in control of the method of FIG. 2. Thus, it is possible to skip step 206 and use only the model outputs in place of the sampled model outputs in step 208.

Returning to step 206, different statistical sampling methods may be used to sample the model outputs. Examples of statistical sampling methods that may be used with the one or more embodiments include multinomial sampling and multinomial beam sampling, but other statistical sampling methods may be used. Whichever sampling method is selected, only certain ones of the model inputs are selected for further use in the method of FIG. 2. Non-selected model outputs may be discarded, stored for later use, etc.

Step 208 includes clustering the sampled model outputs (or possibly the model outputs) into clusters that represent a distinct semantic meaning of the sampled model outputs. Clustering may be performed according to one or more different clustering techniques.

Examples of clustering machine learning models include paraphrase detection, semantic similarity evaluation, entailment classification, and combinations thereof. Other clustering techniques may be used, such as k-means clustering and combinations of the above; thus, the one or more embodiments are not necessarily limited to the clustering techniques mentioned above.

Paraphrase detection is performed using a paraphrase detection machine learning model which is trained to determine whether two vectors, representing different texts (e.g., any two of the model outputs or any two of the sampled model outputs), are of equivalent semantic meaning. The output of the paraphrase detection machine learning model may be binary, meaning that a value of "0" represents a determination that the two vectors semantically similar and a value of "1" represents that a determination of the two vectors is semantically similar. The output of the paraphrase detection machine learning model may be continuous, meaning that the output is a value between 0 (completely semantically unrelated) and 1 (semantically identical).

Semantic similarity may be determined by identifying a cosine similarity between the two vectors that represent the two texts being compared. The output of the cosine similarity machine learning model may be continuous, meaning that the output is a value between 0 (completely semantically unrelated) and 1 (semantically identical).

Entailment classification may be performed using an entailment machine learning model. The entailment classification compares the first vector to the second vector, but then also compares the second vector to the first vector. This approach is known as a bidirectional comparison. Note that the two comparisons are not necessarily identical.

Entailment classification is a natural language processing task that involves determining the logical relationship between two given sentences: a premise and a hypothesis. The goal is to determine whether the meaning of the hypothesis is entailed (can be inferred) by the meaning of the premise, contradicted by it, or is neutral (no clear relationship).

Entailment classification may involve using supervised machine learning techniques. A model is trained on a labeled dataset where each instance includes a premise, a hypothesis, and an entailment label (e.g., "entailment," "contradiction," or "neutral"). The model learns to capture the semantic relationship between the premise and the hypothesis based on various linguistic and contextual features. Those vectors that receive the label of "entailment" (or possibly both "entailment" or "neutral") may be deemed to be semantically similar, and thus belong to the same cluster. Those that receive the label of "contradiction" (or possibly both "contradiction" or "neutral") may be deemed to be semantically dissimilar, and thus belong to different clusters.

As indicated above, multiple different clustering techniques may be used. Thus, it is possible that multiple sets of clusters may be present, each set of clusters having been generated by a different clustering technique.

Step 210 includes generating a confidence metric for the user input, the confidence metric indicating a predictive entropy of the clusters. The confidence metric may be determined by determining a predictive entropy of the clusters or the predictive entropy of the sets of clusters. Thus, the confidence metric may be characterized as a predictive entropy of the clusters.

The predictive entropy is a measure of the differences in semantic meanings among the clusters. The predictive entropy may be determined using a p*log (p) scheme which takes, as input, the centroids of pairs of the sets of clusters. The lower the entropy score, the higher the confidence (i.e., the lower the entropy score, the greater the semantic similarity between the clusters). In this manner, the predictive entropy represents a combination of query prompt uncertainty of the user input and output uncertainty of the sampled model outputs.

In the case of multiple sets of clusters, the predictive entropy may be measured for each set of clusters. An average then may be taken of the total set of predictive entropy scores that are generated for the multiple sets of clusters. The average entropy score becomes the entropy score, and hence the confidence metric, for the user input with respect to the machine learning model under test.

Step 212 includes routing, automatically in a computing system, the user input based on whether the confidence metric satisfies or fails to satisfy a threshold value. In an embodiment, the threshold is satisfied when the confidence metric meets or exceeds the threshold value. The threshold is not satisfied when the confidence metric is less than the threshold value.

However, satisfaction of the threshold may be defined differently in different embodiments. For example, the threshold may be satisfied only when the confidence metric exceeds the threshold value. In another example, the threshold value may be defined in a manner that the threshold is satisfied when the confidence metric is less than the threshold value. Thus, the one or more embodiments contemplate different definitions of "satisfying" the threshold; however, satisfaction of the threshold is pre-determined and is quantitatively defined.

When the confidence metric satisfies the threshold, the machine learning model under test may be said to "understand" the semantic meaning of the original user input. Additionally, in this case, the machine learning model under test may be determined to be "confident" enough to return a current output of the machine learning model in response to the original user input.

Thus, when the confidence metric satisfies the threshold, the user input is provided to the machine learning model under test. The machine learning model then returns the output of the machine learning model to the user device. More particularly, the method includes executing the MLM on the user input to generate a presentation output, and then transmitting the resulting presentation output to a user device from which the user input was received.

However, when the confidence metric fails to satisfy the threshold, the user input is routed to some destination other than the machine learning model under test. For example, the user prompt may be routed to a facilitator user device. In this case, the user input is displayed on the facilitator user device. A human facilitator may then answer the user prompt, in which case the facilitator's answer is returned to the user device that supplied the original user input.

In a variation, routing to another destination may include routing the user input to an additional MLM other than the MLM. For example, a knowledge domain of the user input may be determined, and the user input is then routed to a different language processing model that is trained based on that particular knowledge domain.

In this case, the alternative MLM may be executed on the user input to generate an alternative output. The alternative user input is then presented to a user device from which the user input was received.

The examples provided above show how the confidence estimation controller may be configured to route a user input. Actual routing may be performed using an application programming interface or some other software or hardware tool.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

FIG. 3 and FIG. 4 show an in-use example of the system of FIG. 1 and the method of FIG. 2. Specifically, FIG. 3 and FIG. 4 show an example use of semantic confidence metrics for uncertainty estimation in large language models, in accordance with one or more embodiments. The following example is for explanatory purposes only and not intended to limit the scope of the one or more embodiments.

FIG. 3, in particular, shows how a human user may interact with a chatbot, according to the one or more embodiments. FIG. 4 shows exemplary details of how the confidence metric is generated and used in the context of the example of FIG. 3. In FIG. 3 and FIG. 4, common reference numerals refer to common objects having common descriptions.

Turning to FIG. 3, a user (300) is using a user device (302). The user is searching for information regarding whether expenses spent on a pet are tax deductible. Thus, the user inputs a user prompt (304) into the user device (302). The prompt (304) is "are pets deductible."

The user prompt (304) is transmitted to a server (306). The server (306) is executing a chatbot which is programmed to receive the user prompt (304) and to display answers to the user regarding the user prompt (304). In particular, a large language model is executable by the server (306). The large language model is programmed to take, as input, the user prompt (304) and to generate, as output, a natural language answer which is then displayed on the user device (302) via the chatbot.

However, before generating or displaying the output of the large language model, the confidence metric for the user prompt (304) is generated according to the method described with respect to FIG. 2. The confidence metric is compared to a threshold value. What the user (300) ultimately sees depends on whether the confidence metric satisfies the threshold value.

For answer 1 (308), the confidence metric satisfied a threshold value. As a result, the user prompt (304) is routed to the large language model that was tested. The output of the machine learning model is, "Maybe not. Pet expenses are only deductible for a pet business." The machine learning model output (i.e., the answer 1 (308)) is displayed on the user device (302) via the chatbot as the presentation output.

However, for answer 2 (310), the confidence metric did not satisfy the threshold value. In this example, because the confidence metric did not satisfy the threshold value, the chatbot routes the user prompt (304) to a facilitator user device (312) operated by a human facilitator (314). The chatbot displays the user prompt (304) on the facilitator user device (312) to the human facilitator (314). The chatbot also displays the answer 2 (310) on the user device (302) of the user (300), which states, "Let me put you in touch with someone who can help answer that question."

The human facilitator (314) then considers the user prompt (304) and types directly into the chatbot to generate a help desk response (316). The help desk response (316) is displayed on the user device (302) to the user (300) via the chatbot. Alternatively, a new live chat session may be instituted for the user (300).

In either case, the help desk response (316) states, "Hi, my name is Chris. I will be happy to help you with your question. Expenses related to pets, like a family dog or cat, are generally not tax deductible. However, let me ask you this question: do you run a business related to caring for pets?" In this manner, the user again receive an answer that is relevant and useful to the user.

Thus, by using a confidence metric generated for the machine learning model that drives the chatbot, the user (300) is more likely to receive an answer that is both understandable and helpful to the user (300). Accordingly, the user experience of the user (300) may be improved.

The details regarding generating the confidence metric mentioned in FIG. 3 is now described with respect to FIG. 4. Again, the user (300) provides, via the user device (302), the user prompt (304) to a chatbot executed by the server (306). The user prompt (304) is, again, "are pets deductible?"

The server (306) executes a machine learning controller, such as the machine learning controller (152) of FIG. 1A. The machine learning controller generates a number of modified inputs (400). In the example, modified input A1 (402) is "are pets deductible." Modified input A2 (404) is "are pets deductible," which is a deliberate duplicate of the modified input A1 (402) (i.e., the modified input A2 (404) is an instance of the modified input "A." In addition, the modified inputs (400) include modified input B1 (406), which is "are pets a deduction?" In addition, the modified inputs (400) includes modified input ZN (408), which is "may pets be deducted." The modified inputs (400) may include many more examples, as indicated by the ellipsis shown for the modified inputs (400). Not all of the modified inputs may be semantically similar to the user prompt (304).

Next, the modified inputs (400) are provided to the machine learning model under test. The machine learning model produces a number of model outputs (410), one for each of the modified inputs (400). Thus, the model outputs (410) include a model output for modified input A1 (412), which output states, "Maybe not. Pet expenses are only deductible for a pet business." A model output for the modified input B1 (414) states, "a business involving pets might be able to deduct pet expenses." A model output for modified input ZN (416) may state, "I don't' understand the question." In other words, the model output for modified input ZN (416) is an indication that the model could not generate an intelligible answer when the model output for modified input ZN (416) was given as input to the machine learning model.

As the ellipsis show for the model outputs (410), many more model outputs may be present. Thus, in this example, only some of the model outputs (410) are selected for use in determining the confidence metric. The selected ones of the model outputs (410) are the sampled model outputs (418). In this case, the model output for the modified input B1 (420) and the model output for the modified input ZN (422) are selected for use. Additional ones of the sampled model outputs (418) may be present, as shown by the ellipsis.

Next, a cluster machine learning model generates a number of clusters (424). Each cluster represents a different semantic meaning. The semantic meanings may be represented by numbers that represent the semantic closeness of one cluster to another cluster in the clusters (424). However, for the ease of understanding in this example, cluster 1 (426) are those of the sampled model outputs (418) that have a semantic meaning of "an uncertain 'yes.'". The cluster N (428) are those of the sampled model outputs (418) that have a semantic meaning of "the model did not understand."

Once the clusters (424) are generated, a confidence metric (430) is generated for the clusters (424). As indicated above, the confidence metric represents the predictive entropy of the clusters (424). A low entropy represents semantic similarity among the clusters (424), and thus may represent a high confidence metric that the machine learning model will give an appropriate response to the user prompt (304).

The confidence metric (430) is compared to a threshold (432). If the confidence metric (430) satisfies the threshold (432), then the user prompt (304) is routed to the large language model (434) (which is the same machine learning model that was under test during the earlier steps in FIG. 4). The large language model (434) is the software that provides an automated response to a chatbot, which returns a presentation output to the user device (302). (The user device (302) shown at the end of the example shown in FIG. 4 is the same as the user device (302) at the beginning of the example shown in FIG. 4.) However, the presentation output may also be provided to one or more other user devices or provided to a different user device.

In the event that the confidence metric (430) fails to satisfy the threshold (432), then the user input (304) is routed to a facilitator user device (436). A human facilitator (438) reviews the user prompt (304) and supplies an answer to the facilitator user device (436) via a user input device. The answer is then sent as a presentation output to the user device (302). In this example, the human facilitator (438) is an accountant, who has the subject matter expertise to answer the question in an appropriate manner.

Thus, the example of FIG. 4 shows that the one or more embodiments may be used to measure the confidence that a particular input provided to a particular machine learning model will generate a consistent output for reporting to the user device (302). In this manner, the automated system for answering user questions will generate improved answers, or at least will be less likely to generate inappropriate answers to the user questions.

Figure 5A:
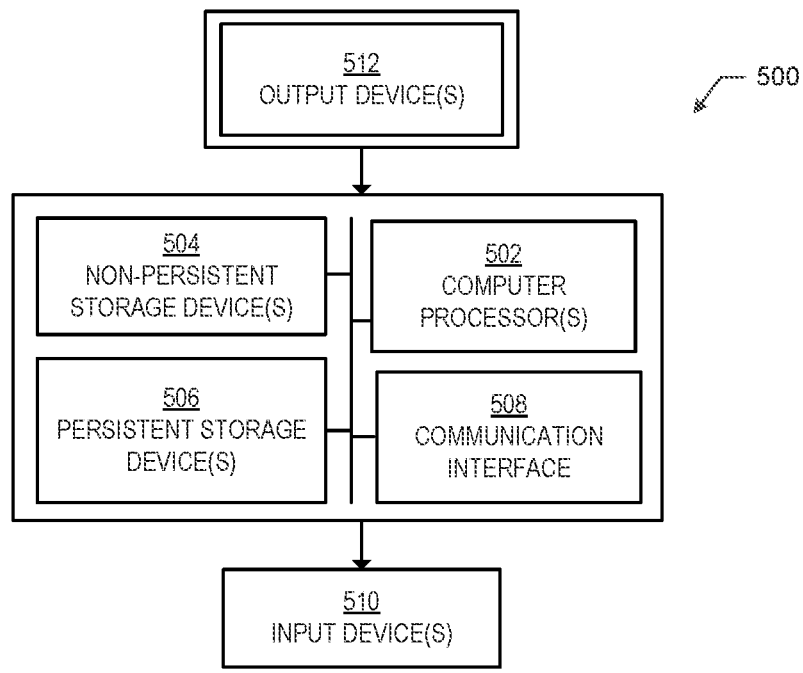
FIG. 5A and FIG. 5B show a computing system and network environment, in accordance with one or more embodiments.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) may be one or more cores or micro-cores of a processor. The computer processor(s) (502) includes one or more processors. The one or more processors may include a central processing unit (CPU), a graphics processing unit (GPU), a tensor processing units (TPU), combinations thereof, etc.

The input devices (510) may include a touchscreen, keyboard, mouse, microphone, touchpad, electronic pen, or any other type of input device. The input devices (510) may receive inputs from a user that are responsive to data and messages presented by the output devices (512). The inputs may include text input, audio input, video input, etc., which may be processed and transmitted by the computing system (500) in accordance with the disclosure. The communication interface (508) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the output devices (512) may include a display device, a printer, external storage, or any other output device. One or more of the output devices may be the same or different from the input device(s). The input and output device(s) may be locally or remotely connected to the computer processor(s) (502). Many different types of computing systems exist, and the aforementioned input and output device(s) may take other forms. The output devices (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

Figure 5B:
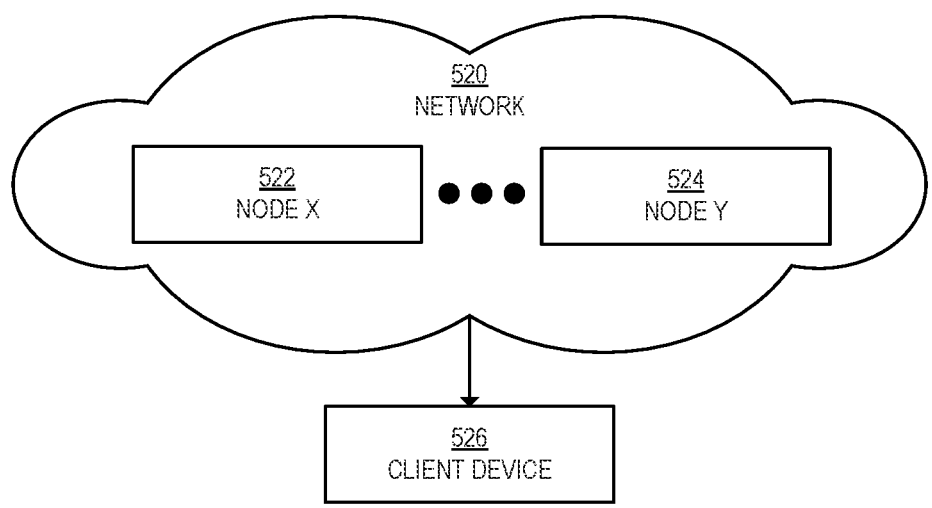

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522), node Y (524)) in the network (520) may be configured to provide services for a client device (526), including receiving requests and transmitting responses to the client device (526). For example, the nodes may be part of a cloud computing system. The client device (526) may be a computing system, such as the computing system shown in FIG. 5A. Further, the client device (526) may include and/or perform all or a portion of one or more embodiments.

The computing system of FIG. 5A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
receiving a user input comprising natural language text;
generating a plurality of modified inputs from the user input;
executing a machine learning model on the plurality of modified inputs to generate a plurality of model outputs;
sampling the plurality of model outputs using a statistical sampling strategy to generate a plurality of sampled model outputs;
clustering the plurality of sampled model outputs into a plurality of clusters;
generating a confidence metric of the plurality of clusters; and
routing, automatically in a computing system, the user input based on whether the confidence metric satisfies a threshold value.

2. The method of claim 1, wherein the machine learning model comprises a single large language machine learning model.

3. The method of claim 1, wherein:
clustering further comprises clustering the plurality of sampled model outputs into a plurality of sets of clusters,
each of the plurality of sets of clusters is clustered according to a different clustering technique,
each cluster in a particular set of clusters of the plurality of sets of clusters represents a distinct semantic meaning of the plurality of sampled model outputs.

4. The method of claim 3, wherein each different clustering technique is selected from the group consisting of: paraphrase detection, semantic similarity, and entailment.

5. The method of claim 1, wherein generating the plurality of modified inputs comprises generating both of:
a plurality of semantically invariant prompts that are semantically similar to the user input; and
a plurality of semantic equivariant inputs that alter a semantic meaning of the user input.

6. The method of claim 1, wherein:
the confidence metric fails to satisfy the threshold value, and
routing further comprises routing the user input to a destination other than the machine learning model.

7. The method of claim 6, wherein routing further comprises routing the user input to a facilitator user device and displaying the user input on the facilitator user device.

8. The method of claim 6, wherein:
routing further comprises routing the user input to an additional machine learning model other than the machine learning model, and
the method further comprises:
executing the additional machine learning model on the user input to generate an alternative output; and
presenting the alternative output to a user device from which the user input was received.

9. The method of claim 1, wherein:
the confidence metric satisfies the threshold value, and
routing further comprises routing the user input to the machine learning model.

10. The method of claim 9, further comprising:
executing the machine learning model on the user input to generate a presentation output; and
transmitting the presentation output to a user device from which the user input was received.

11. The method of claim 1, wherein the statistical sampling strategy is selected from the group consisting of: multinomial sampling and multinomial beam sampling.

12. The method of claim 1, wherein the confidence metric comprises a predictive entropy that represents a combination of query prompt uncertainty of the user input and output uncertainty of the plurality of sampled model outputs.

13. A system comprising:
a processor;
a machine learning model executable by the processor, wherein the machine learning model comprises a language processing machine learning model;
a data repository in communication with the processor, and storing:
a user input comprising natural language text,
a plurality of modified inputs,
a plurality of model outputs of the machine learning model,
a plurality of sampled model outputs of the machine learning model,
a plurality of clusters of the sampled model outputs of the machine learning model,
a confidence metric of the plurality of clusters, and
a threshold value comparable to the confidence metric; and
a confidence estimation controller which, when executed by the processor:
executes the machine learning model to generate the plurality of model outputs,
samples the plurality of model outputs using a statistical sampling strategy to generate the plurality of sampled model outputs,
clusters the plurality of sampled model outputs into the plurality of clusters, and generates the confidence metric; and
a machine learning controller configured to route, automatically, the user input based on whether the confidence metric satisfies or fails to satisfy the threshold value.

14. The system of claim 13, further comprising:
a cluster machine learning model trained to cluster the plurality of sampled model outputs.

15. The system of claim 13, wherein the machine learning controller is further configured such that when the confidence metric fails to satisfy the threshold value, the machine learning controller routes the user input to a destination other than the machine learning model.

16. The system of claim 15, wherein the destination other than the machine learning model comprises a facilitator user device for displaying the user input on the facilitator user device.

17. The system of claim 15, wherein the destination other than the machine learning model comprises an additional machine learning model other than the machine learning model.

18. The system of claim 13, wherein the machine learning controller is further configured such that when the confidence metric satisfies the threshold value, the machine learning controller routes the user input to the machine learning model.

19. The system of claim 18, wherein the machine learning controller is further programmed, when executed by the processor, to:
execute the machine learning model on the user input to generate a presentation output; and
transmit the presentation output to a user device from which the user input was received.

20. A non-transitory computer readable storage medium storing computer readable program code which, when executed by a processor, performs a computer-implemented method comprising:
- receiving a user input comprising natural language text;
- generating a plurality of modified inputs from the user input;
- executing a machine learning model on the plurality of modified inputs to generate a plurality of model outputs;
- sampling the plurality of model outputs using a statistical sampling strategy to generate a plurality of sampled model outputs;
- clustering the plurality of sampled model outputs into a plurality of clusters;
- generating a confidence metric of the plurality of clusters; and
- routing, automatically in a computing system, the user input based on whether the confidence metric satisfies a threshold value.

* * * * *